Sept. 8, 1936.　　W. A. DOREY ET AL　　2,053,325
LIGHT MIXING APPARATUS
Filed July 1, 1932

INVENTORS.
William A. Dorey &
Henry M. Dixon Jr.
BY Jules Shiberman
ATTORNEY.

Patented Sept. 8, 1936

2,053,325

UNITED STATES PATENT OFFICE 2,053,325

LIGHT MIXING APPARATUS

William A. Dorey and Henry M. Dixon, Jr., Newark, Ohio, assignors to Holophane Company, Inc., New York, N. Y., a corporation of Delaware Application July 1, 1932, Serial No. 620,322

9 Claims. (Cl. 240—11.4)

The present invention relates to apparatus designed for mixing light from two (or more) spaced light sources so that it is mixed or combined into a single beam. The mixing is accomplished by a reflecting surface adapted to receive direct light from both sources and commingle the reflected rays originating in one source with the direct rays from the other source so as to produce light of blended character. It is more particularly directed toward light projectors and color mixers adapted to use long or rectilinear light sources usually of unlike character, color, or operating characteristics.

Illustrative examples of rectilinear light sources, which may be employed, include incandescent lamps with rectilinear filaments, gaseous electrical glow tubes, neon tubes, mercury vapor lamps, and linearly arranged series of closely spaced, substantially point source lamps.

The present invention contemplates a light projector having a specular reflecting portion in the shape or form of a fragment of an elliptical cylinder and two light sources, such as above mentioned, one extending substantially along one focus of the ellipse, while the other (preferably a different type of light source) extends substantially along the other focus. The form of the specular reflecting portion may also be in the shape or form of a fragment of an ellipsoid with its point foci coinciding with two substantially point source lamps.

The portion which is elliptical in contour accepts light rays from either focal point and refocuses them at the second focal point.

Within certain limits, this portion of the reflector could be circular instead of elliptical in form. The light sources in this variation would be offset just enough with respect to the center of the circle to prevent damaging interchange of heat and the reflected light would converge toward a point in the proximity of but not coinciding with the axis of the opposite light source, thereby reducing interference or loss of light in passing through the source.

Other manners of reducing this interference effect, especially in the elliptical reflecting form, would be to slightly corrugate, ripple, or etch the reflecting surface, or to move the light sources a trifle out of focus.

The light may be emitted directly from the reflector, but it is preferably passed through a glass closure. This glass closure may be clear or of a more or less diffusing nature such as etched, flashed, opal, ribbed, or pebble glass to soften the direct light and reduce glare, or it may be prismatic where controlled light distributions are desired.

The accompanying drawing shows, for the purpose of illustrating the invention, several of the many possible embodiments in which the present invention may take form, it being understood that the drawing is illustrative of the invention rather than limiting the same. In this drawing.

Figure 3:
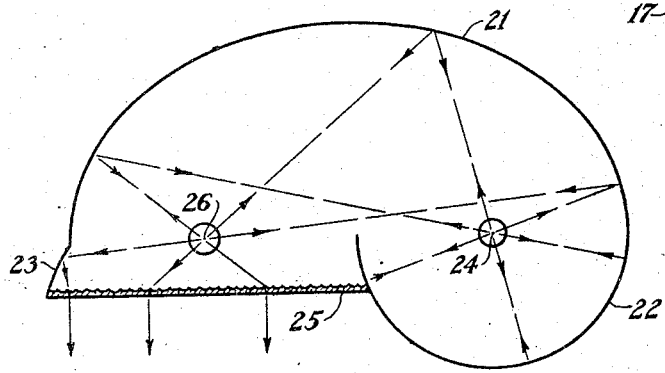
Figure 4:
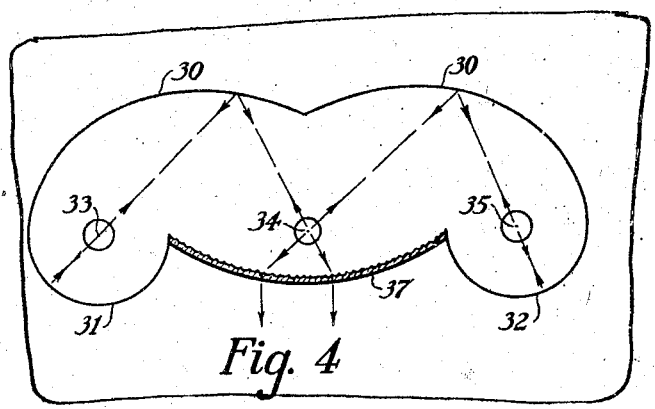
Figure 4:
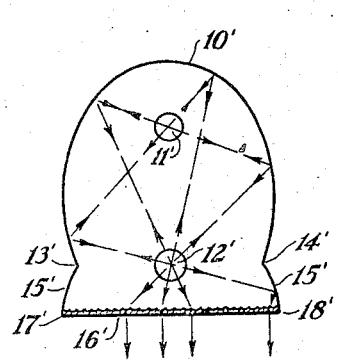

Fig. 3 is a diagrammatic sectional view taken in a plane at right angles to the lamp axes and illustrating a projector employing an elliptical cylindrical form with modified auxiliary reflecting surfaces such that no direct light from one source falls on the lens plate; and Fig. 4 is a diagrammatic sectional view taken in a plane at right angles to the lamp axes and illustrating a projector employing an elliptical form with the major elliptical axis normal to the plane of the lens face instead of parallel to it.

Figure 1:
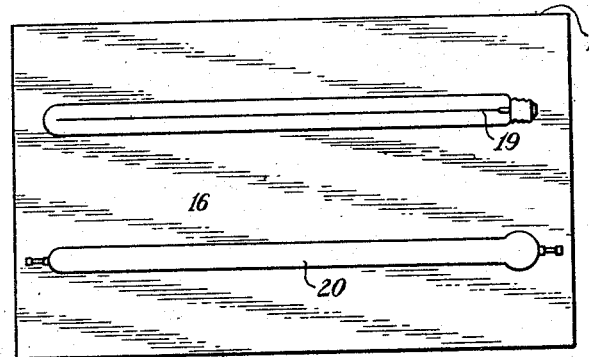
Fig. 1 is a diagrammatic plan view of the light projector or mixer.
Figure 2:
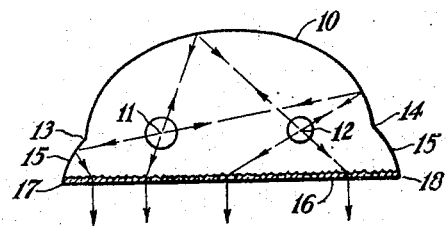
Fig. 2 is a diagrammatic sectional view taken in a plane at right angles to the lamp axes and illustrating a projector employing an elliptical form with modified auxiliary reflecting surface.

In the form shown in Figs. 1 and 2, the projector or mixer includes a semi-elliptical hollow cylindrical reflector form truncated through the major axis. This form is indicated at 10. The foci of the ellipses are at 11 and 12 and the reflector has an opening approximately 180° from the point 13 to the point 14. Cylindrical reflectors of modified section 15 are adjacent to the elliptical reflector at 13 and 14, and a rectangular prismatic glass plate 16 has its edges 17 and 18 in the horizontal projection of the reflector. The plate 16 may also take the form of clear, etched, flashed, opal, ribbed, or pebbled glass. The reflectors 10 and 15 can be of any specular reflecting or slightly mat finished material, polished metal, prismatic or silvered glass.

The light sources, consisting for example of a lamp having a rectilinear filament 19 of great length and of a gaseous electrical glow tube having a luminous surface 20 of large dimension, are made so that the filament 19 and the surface 20 coincide as closely as possible with the foci 11 and 12 of the elliptical reflector.

The rectangular glass plate 16 receives direct rays from the sources emitted in the lower sectors 17—11—18 and 17—12—18 and, after reflection, the rays emitted in the upper sectors 17—11—18 and 17—12—18. This plate 16 concentrates these rays into a laterally open flat beam which may be operated upon by it. If the distance from 11 and 12 to the lens face plane be increased, the rays are caused to converge more. Decreasing the distance from 11 and 12 to the lens face plane causes the rays to diverge more. Shifting either or both 11 and/or 12 laterally to right or left causes the beam to slant obliquely downward from the lens plate.

Fig. 3 illustrates a form of light projector or mixer wherein the reflecting portion is composed of three contours, 21 being a fragment of an elliptical cylinder, 22 a fragment of a circular cylinder concentric with the focus, and 23 a modified form. No direct light from the light source 24 extending along the focus at the right is delivered to the plate 25. Reflecting portion 22, by virtue of its circular contour, redirects the rays emitted at the lower sector back through the focus thereby reinforcing the rays of source 24 in the upper sector. The combined rays are then reflected by elliptical portion 21 so that they refocus to the opposite focus and mix or combine with the rays from source 26.

In Fig. 4 an elliptical cylinder with the major axis vertical instead of horizontal is illustrated, the same reference characters as used in Fig. 2 being employed, with a prime (') added.

Prismatic plates of lenticular form have the advantage over coverings of clear, etched, flashed, opal, ribbed or pebbled glass in that the light distribution from such a device may be varied over wide ranges. These plates may be either flat, or substantially so as shown, or may be trough shaped.

Prior art in controlling and especially mixing the light outputs of sources having considerable length and variation of spectral range has been unsatisfactory. These devices not only were lacking in control but also the resultant light was imperfectly mixed so that multi-colored shadows were produced.

The present invention corrects both of these short comings. The reflector by virtue of its elliptical form accepts light from one source and reflects it through the cooperative source thereby delivering premixed light to the plate. Prismatic glass plates accept the premixed light and deliver it into desired directions.

Light projectors of this nature produce an entirely lighted surface effect on the surface of the plates irrespective of whether one or both sources are operating.

It is obvious that the invention may be embodied in many forms and constructions, and we wish it to be understood that the particular forms shown are but a few of the many forms. Various modifications and changes being possible, we do not otherwise limit ourselves in any way with respect thereto.

What is claimed is:

1. In combination, two parallel light sources, and a reflector parallel to the light sources and having a longitudinally extending aperture disposed to transmit direct light from at least one of the light sources and being of substantially elliptical contour with foci at the light sources to reflect light originating in one source through the other focus, whereby the emitted light may be premixed or partake of the character of the light of either source.

2. In combination, two parallel light sources, a reflector parallel to the light sources and having a longitudinally extending aperture disposed to transmit direct light from at least one of the light sources and being of substantially elliptical contour with foci at the light sources to reflect light originating in one source through the other focus, whereby the emitted light may be premixed or partake of the character of the light of either source, and a prismatic light transmitting member of generally rectangular shape for intercepting the light passing through said aperture.

3. A luminair comprising two parallel rectilinear light sources, a reflector form having a portion of elliptical contour with the light sources disposed along the foci thereof, the reflector form being extended beyond the elliptical portion to provide a longitudinally extending aperture disposed to transmit direct light from at least one of said light sources and light originating in the other light source and reflected by the elliptical portion of the reflector form through the first focus, whereby the light pattern of the light emitted through the aperture may be substantially the same when either light source is operated alone or when both sources are operated, and whereby light from both sources is mixed at the foci.

4. A luminair comprising two parallel rectilinear light sources, a reflector form having a portion of elliptical contour with the light sources disposed along the foci thereof, the reflector form being extended beyond the elliptical portion to provide a longitudinally extending aperture disposed to transmit direct light from at least one of said light sources and light originating in the other light source and reflected by the elliptical portion of the reflector form through the first focus, whereby the light pattern of the light emitted through the aperture may be substantially the same when either light source is operated alone or when both sources are operated, and whereby light from both sources is mixed at the foci, and a light transmitting plate across the aperture and through which the direct and reflected light is passed.

5. A luminair as claimed in claim 4, wherein the plate is generally parallel with the plane of the major axis of the ellipse.

6. A luminair as claimed in claim 4, wherein the plate is generally parallel with the plane of the minor axis of the ellipse.

7. In a light mixing apparatus, in combination, a reflector form having two parts, one a substantially semi-elliptical hollow cylinder truncated through the major axis, the other being a substantially semi-circular hollow cylinder concentric with a focus of the ellipse and extending from the end of the elliptical part to intercept the major axis of the ellipse, and two rectilinear light sources each disposed substantially in a focus of the ellipse, the light being emitted through the longitudinal aperture opposite the focus not within the circular cylindrical portion, and a transmitting plate in said aperture, the light pattern of the emitted beam being substantially the same irrespective of whether either or both sources are functioning, and partaking of the color or colors of the sources in operation.

8. In a light mixing apparatus, in combination, a reflector form having two parts, one a substantially semi-elliptical hollow cylinder truncated through the major axis, the other being a substantially semi-circular hollow cylinder concentric with a focus of the ellipse and extending from the end of the elliptical part to intercept the major axis of the ellipse, and two rectilinear light sources each disposed substantially in a focus of the ellipse, the light being emitted through the longitudinal aperture opposite the focus not within the circular cylindrical portion, and a light transmitting plate parallel with the plane of the major axis and closing said aperture, the light pattern of the emitted beam being substantially the same irrespective of whether either or both sources are functioning, and partaking of the color or colors of the sources in operation.

9. An extended reflector form of elliptical cross section, light sources along the foci and a light transmitting member parallel with one of the axes of the ellipse to receive both direct light from one light source and reflected light from the other light source, whereby the emitted light may be premixed or partake of the character of the light of either source.

WILLIAM A. DOREY.
HENRY M. DIXON, Jr.